(12) United States Patent
Aho

(10) Patent No.: US 10,674,325 B1
(45) Date of Patent: Jun. 2, 2020

(54) MULTIMEDIA MESSAGING SERVICE

(75) Inventor: Outi Aho, Lempäälä (FI)

(73) Assignee: Conversant Wireless Licensing S.a r.l, Luxembourg (LU)

( * ) Notice: Subject to any disclaimer, the term of this patent is extended or adjusted under 35 U.S.C. 154(b) by 629 days.

(21) Appl. No.: 09/707,103

(22) Filed: Nov. 6, 2000

(30) Foreign Application Priority Data

Nov. 5, 1999 (FI) ...................................... 19992401

(51) Int. Cl.
H04W 4/12 (2009.01)

(52) U.S. Cl.
CPC ...................................... H04W 4/12 (2013.01)

(58) Field of Classification Search
CPC ...... H04W 4/12; H04W 4/14; H04M 1/72552
USPC ............ 455/466, 445, 423, 412, 455, 452.1, 455/452.2, 453; 370/351, 352, 395.2, 370/401; 709/203, 249, 227, 229, 223
See application file for complete search history.

(56) References Cited

U.S. PATENT DOCUMENTS

| | | | | |
|---|---|---|---|---|
| 5,638,412 | A * | 6/1997 | Blakeney et al. ............ | 375/377 |
| 5,802,314 | A * | 9/1998 | Tullis ...................... | H04L 29/06 379/100.13 |
| 6,230,197 | B1 * | 5/2001 | Beck et al. .................... | 709/223 |
| 6,333,919 | B2 * | 12/2001 | Gaffney ........................ | 370/254 |
| 6,356,529 | B1 * | 3/2002 | Zarom .......................... | 370/231 |
| 6,374,112 | B1 * | 4/2002 | Widegren ............. | H04W 28/18 370/352 |
| 6,421,707 | B1 * | 7/2002 | Miller et al. .................. | 709/206 |
| 6,529,475 | B1 * | 3/2003 | Wan et al. ..................... | 370/231 |
| 6,556,666 | B1 * | 4/2003 | Beyda et al. ............... | 379/88.12 |
| 6,567,667 | B1 * | 5/2003 | Gupta et al. .................. | 455/445 |
| 6,587,480 | B1 * | 7/2003 | Higgins et al. ............... | 370/522 |
| 6,600,732 | B1 * | 7/2003 | Sevanto et al. ............... | 370/349 |

(Continued)

FOREIGN PATENT DOCUMENTS

| EP | 848560 A2 * | 6/1998 |
|---|---|---|
| EP | 1113631 A2 * | 12/2000 |

(Continued)

OTHER PUBLICATIONS

Sevanto,J "Multimedia messaging service for GPRS and UMTS",Sep. 21-24, 1999 IEEE, vol. 3, p. 1422-1426.*

(Continued)

*Primary Examiner* — Dong-Chang Shiue
(74) *Attorney, Agent, or Firm* — Conversant Wireless Licensing

(57) ABSTRACT

A method for implementing a multimedia messaging service between a terminal that communicates with a network over a radio path and a server includes receiving a multimedia message addressed to the terminal at the server. The multimedia message includes at least one multimedia component. A notification message is transmitted over the radio path to the terminal to indicate that a multimedia message is available for retrieval from the server. The notification message includes the information on at least one property of the multimedia component. The notification message is received at the terminal, whereupon a bearer is selected for transferring the multimedia component over the radio path on the basis of the property data conveyed by the notification message. The multimedia component is transferred from the server to the terminal over the radio path using the bearer selected by the terminal.

18 Claims, 4 Drawing Sheets

(56) References Cited

U.S. PATENT DOCUMENTS

| | | | |
|---|---|---|---|
| 6,608,832 B2 * | 8/2003 | Forslow | 370/353 |
| 6,674,733 B1 * | 1/2004 | Huusko | 370/329 |
| 6,678,524 B1 * | 1/2004 | Hansson et al. | 455/445 |
| 6,751,227 B1 * | 6/2004 | Ahmavaara et al. | 370/410 |
| 6,826,406 B1 * | 11/2004 | Vialen et al. | 455/450 |
| 2002/0155849 A1 * | 10/2002 | Urano et al. | 455/466 |
| 2003/0055912 A1 * | 3/2003 | Martin, Jr. | H04L 12/5692 709/218 |

FOREIGN PATENT DOCUMENTS

| | | | |
|---|---|---|---|
| GB | 2333012 A | | 7/1999 |
| JP | 08251284 A | * | 9/1996 |
| WO | WO 96/19068 | | 6/1996 |
| WO | WO 98/19438 | | 5/1998 |
| WO | WO9823110 | * | 5/1998 |
| WO | WO 99/01991 | | 1/1999 |
| WO | WO 99/14909 | | 3/1999 |
| WO | WO 99/16266 | | 4/1999 |
| WO | WO 9941920 | * | 8/1999 |
| WO | WO 99/52307 | | 10/1999 |
| WO | WO 99/56431 | | 11/1999 |
| WO | WO 99/57619 | | 11/1999 |
| WO | WO99/66746 | * | 12/1999 |
| WO | WO 00/64110 | | 10/2000 |
| WO | WO 00/64203 | | 10/2000 |
| WO | WO 0135689 A1 | * | 5/2001 |

OTHER PUBLICATIONS

Sevanto, Multimedia Messaging Service for GPRS and UMTS (IEEE, vol. 3, Sep. 21-24, 1999).*
JP Patent Abstracts of Japan 06-276222, Sep. 30, 1994, Nippon Telegr & Teleph Corp.

* cited by examiner

MULTIMEDIA MESSAGING SERVICE

FIELD OF THE INVENTION

The present invention relates to a messaging service. In particular, the invention relates to a multimedia messaging service in a wireless communication system, such as the WAP system (Wireless Application Protocol).

BACKGROUND OF THE INVENTION

Wireless communication networks and the Internet network are expanding rapidly and their number of users is increasing. Introducing advanced Internet services into digital mobile stations of wireless communication networks, such as so-called media phones, is possible, e.g. with the aid of WAP technology. WAP is an open standard designed to globally support the majority of digital wireless communication networks, such as GSM (Global System for Mobile Communications), GPRS (General Packet Radio Service), PDC (Personal Digital Cellular), CDMA IS-95 (Code Division Multiple Access), TDMA IS-136 (Time Division Multiple Access) and third generation networks, such as WCDMA (Wideband CDMA) and CDMA-2000. Because the WAP system was developed only recently and because the WAP system specifications in some cases only define the frameworks for different implementations, there exist no known solutions for the implementation of certain functions of the WAP system.

In the WAP system (FIG. 1), a wireless terminal or mobile station MS, here a so-called WAP terminal, that uses WAP protocols for external communication can communicate with a server 20 of the Internet network. The connection between the WAP terminal and the Internet network is implemented by a WAP gateway 15, which operates as a message transmission element between the WAP terminal MS and an Internet network 18. The WAP gateway 15 converts messages directed by the WAP terminal to the Internet network 18, as necessary, into messages according to some Internet protocol, such as the TCP/IP protocol (Transmission Control Protocol/Internet Protocol). Correspondingly, messages addressed from the Internet network 18 to a WAP terminal MS of a wireless network 12, are converted as necessary in the WAP gateway 15 into messages according to WAP protocols (e.g. WSP, Wireless Session Protocol). The WAP terminal MS can be any device that uses WAP protocols for external communication, such as a mobile station of a cellular network or a computer terminal, which is in communication with the wireless network 12, e.g. via a mobile station of a cellular network.

Communication modes supported by WAP, intended for information transfer over a radio path are called bearers. In different networks supporting WAP these are, among others, SMS messages (Short Message Service), data calls (CSD, Circuit Switched Data) and packet radio, i.e. GPRS services, USSD service (Unstructured Supplementary Service Data), as well as other bearers defined in the WAP specifications.

As far as its protocols are concerned, the WAP system is a hierarchical system. Both a WAP terminal and a WAP gateway comprise a WAP protocol stack implemented as software comprising specific WAP protocol layers. The WAP protocol layers are, among others, a WSP layer (Wireless Session Protocol), a WTP layer (Wireless Transaction Protocol) and a WDP layer (Wireless Datagram Protocol). The corresponding protocol layers of a WAP terminal and a WAP gateway communicate with each other to implement reliable data transfer between the WAP terminal and the WAP gateway, over a specific bearer.

For a long time users of computer terminals connected to the Internet network have had the opportunity to retrieve multimedia components, such as images, text, short video clips and audio clips in electronic format, into their computer terminals from some server of the Internet network. As data transfer rates increase and the properties of mobile stations improve, interest in a multimedia messaging service for wireless networks has now also been awakened. However, in connection with the WAP system, for example, no solution has so far been presented for implementing such a multimedia messaging service.

International patent application WO 98/19438 presents a solution for implementing a multimedia messaging service in a telecommunication network. The multimedia messaging system presented in document WO 98/19438 comprises a multimedia message store, in which a multimedia message addressed to a specific user is stored. The user is provided with an opportunity to communicate the multimedia presentation properties of his terminal equipment to the multimedia messaging system, which translates said multimedia message either partly or fully, taking into consideration the multimedia presentation properties of the user's terminal. After this, the multimedia messaging system sends the multimedia message to the user' terminal. In the multimedia messaging service presented by document WO 98/19438, the multimedia messaging system is substantially in control of multimedia message delivery, and the document focuses almost totally on the translation of multimedia messages.

When implementing a multimedia messaging service in connection with wireless communication systems, new problems arise due to the limited capacity of wireless terminals and the radio paths used for communication.

A multimedia messaging service for third generation mobile communication networks, such as WCDMA, has been proposed which would be implemented in a manner similar to a short message service, i.e. substantially by pushing messages addressed to a wireless terminal, stored in a specific messaging centre, to the wireless terminal as soon as it can be contacted. However, pushing multimedia messages to a wireless terminal causes problems. Due to the limited memory capacity of a wireless terminal, such as a mobile station of a cellular network, a multimedia message will not necessarily fit into the terminal's available memory. A multimedia message pushed to a wireless terminal may also comprise elements which the wireless terminal is unable to process, whereupon these said elements are sent to the wireless terminal needlessly, wasting radio resources.

SUMMARY OF THE INVENTION

Now, a new solution has been invented for implementing a multimedia messaging service.

According to a first aspect of the invention, there is provided a method for implementing a multimedia messaging service between a terminal that communicates with a communication network over a radio path and a server, the method comprising the steps of:

receiving and storing a multimedia message addressed to the wireless terminal at the server, said multimedia message comprising at least one multimedia component;

transmitting a notification message from the server over the radio path to the wireless terminal.

The method is characterised in that the notification message comprises information about at least one property of said at least one multimedia component; and that the method further comprises the steps of:

receiving said notification message at the terminal;

selecting in the terminal multimedia component(s) to be transferred to the terminal, on the basis of the property data conveyed by said notification message;

selecting in the terminal a bearer for each selected multimedia component, on the basis of the property data conveyed by said notification message; and transferring the selected multimedia component(s) from the server to the terminal over the radio path using the bearer selected by the terminal.

Said property can be, for example, the type, size or priority (priority value) of the multimedia component.

According to a second aspect of the invention, there is provided a terminal, which is arranged to communicate over a radio path with a communication network, said terminal comprising means for receiving a notification message transmitted from a server that is in communication with the communication network over the radio path, the notification message being a notification that a multimedia message addressed to the terminal has arrived at and has been stored in said server the multimedia message comprising at least one multimedia component. The terminal is characterised in that said notification message comprises information about at least one property of said at least one multimedia component and that the terminal comprises:

means for receiving said notification message at the terminal;

means for selecting multimedia component(s) to be transferred to the terminal, on the basis of the property data conveyed by said notification message:

means for selecting a bearer for each selected multimedia component, on the basis of the property data conveyed by said notification message, for the transfer of each selected multimedia component from said server to the terminal over said radio path; and means for informing the communication network of the bearer(s) selected by the terminal.

According to a third aspect of the invention, there is provided a system comprising a terminal, a communication network and a server that is in communication with the communication network for implementing a multimedia messaging service between the terminal that communicates with the communication network over a radio path and the server, the server comprising:

means for receiving a multimedia message addressed to the terminal and means for storing the multimedia message in the server, the multimedia message comprising at least one multimedia component;

means for transmitting a notification message to the terminal to indicate that the multimedia message is available in the server. The system is characterised in that said notification message comprises information about at least one property of said at least one multimedia component, and that the terminal comprises:

means for receiving said notification message;

means for selecting multimedia component(s) to be transferred to the terminal, on the basis of the property data conveyed by said notification message;

means for selecting a bearer for each selected multimedia component, on the basis of the property data conveyed by said notification message, for the transfer of each selected multimedia component from said server to the terminal over said radio path;

means for informing the communication network of the selected bearer(s), and that the system further comprises:

means for transmitting said selected multimedia component(s) via the communication network to the terminal using said selected bearer(s).

According to a fourth aspect of the invention, there is provided a computer program product for implementing a multimedia messaging service in a terminal, said terminal being arranged to communicate over a radio path with a communication network and to receive a notification message transmitted to the terminal over said radio path from a server that is in communication with the communication network, the notification message being a notification that a multimedia message, addressed to the terminal, has arrived at and has been stored in said server, the multimedia message comprising at least one multimedia component. The computer program product is characterised in that said notification message comprises information on at least one property of said at least one multimedia component and that the computer program product comprises:

means for causing the terminal to select multimedia component(s) to be transferred to the terminal, on the basis of the property data conveyed by said notification message:

means for causing the terminal to select a bearer for each selected multimedia component, on the basis of the property data conveyed by said notification message, for the transfer of each selected multimedia component from said server to the terminal over said radio path; and means for causing the terminal to inform the communication network of the bearer(s) selected by the terminal.

In this description, the terminal can be any terminal, such as a mobile station of a cellular communication network or a computer terminal, which communicates with a communication network (e.g. cellular network) over a radio interface. In a preferred embodiment of the invention, the terminal is a mobile station of a cellular network, a WAP terminal, which uses WAP protocols for external communication. In an embodiment of the invention in which the terminal is a computer terminal, the radio interface can take the form of a so-called radio card. Such a card comprises electronics enabling communication with a cellular network and can be removably attached to the computer terminal, for example via an interface compatible with PCMCIA (Personal Computer Memory Card International Association) standards. One existing example of such a radio card is the Nokia Card Phone.

In the preferred embodiment of the invention, said server is a Multimedia Messaging Service Center (MMSC) in communication with a communication network, that conveys multimedia messages to the terminal through a WAP gateway located in the communication network. Multimedia messages may comprise one or more components, such as, e.g. text, voice, images or video pictures.

As an indication that a multimedia message addressed to the terminal has been received by the server, the server transmits a notification message to the terminal comprising information about at least one property of at least one multimedia component of the multimedia message. It should be noted that storage of the multimedia message in the server is implicit. In other words, when a multimedia message addressed to a certain terminal is received by the server, that message becomes present in the memory of the server. That memory may be, for example, the server's random access memory (RAM), or it may be some other physical memory means, such as a hard disk drive. As explained later in this description, it may be necessary for the server to store the multimedia message for a certain period of time, for example, until the terminal to which it is addressed can be contacted. However, even in a situation in which the terminal to which the message is addressed can be contacted substantially at once, temporary storage of the multimedia message in the server may still be considered to take place. In the event that the server must store the multimedia message for a longer period of time, some limit may be placed on the maximum length of time for which the message can be stored. This can be determined, for example, by the subscription options of the addressed terminal. In some situations it may also be necessary for multimedia messages stored in the server to be deleted or overwritten, for example, due to shortage of storage capacity in the server.

On the basis of said property data transmitted from the server in the notification message, the terminal selects an appropriate bearer for the transfer of said multimedia component. Thus, a bearer can be selected separately for each multimedia component of the multimedia message, whereupon different multimedia components can be selected to be transmitted either via the same or different bearers. The bearer for a given component is selected from among bearers supported by the terminal. In the preferred embodiment of the invention, the bearers are those defined in WAP. Said multimedia component is transferred from the MMSC to the terminal using the bearer selected by the terminal.

Because, in the WAP system for example, different bearers used for data transmission consume different amounts of radio resources, it is advantageous to select a bearer that uses the least radio resources for the transmission of each multimedia component from the multimedia messaging system to a WAP terminal. The present invention makes this possible. For example, according to the invention it is not necessary to establish a data call connection to transmit a short textual message, but the message can be transported over the radio path as an SMS message.

BRIEF DESCRIPTION OF THE DRAWINGS

In the following, the invention will be described in detail by referring to the appended drawings, in which.

DETAILED DESCRIPTION

Figure 1:
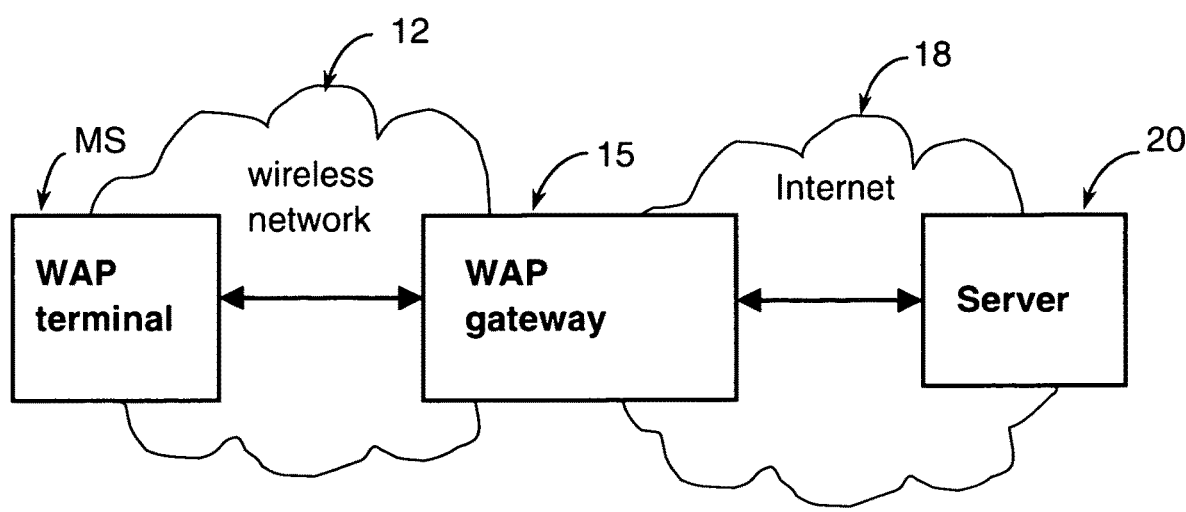
FIG. 1 shows a model of the WAP system known from prior art.
Figure 2:
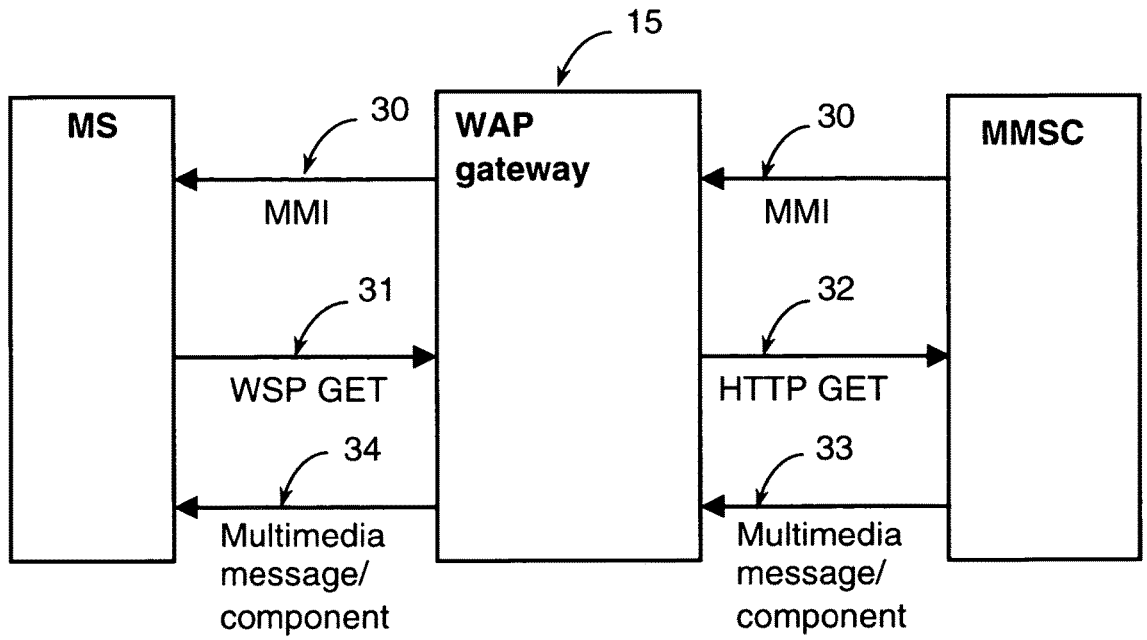
FIG. 2 illustrates an implementation of a method according to the invention in the WAP system.

FIG. 1 was described above in connection with the description of prior art. In a preferred embodiment of the invention (FIG. 2), a multimedia messaging service is examined in a situation, where a wireless terminal MS that uses WAP protocols for communication (or its owner) has subscribed to a multimedia messaging service from a multimedia messaging service center MMSC. The MMSC is a network element, a server, which can be located, for example, in a cellular network or in the Internet. In the multimedia messaging service, the MMSC operates as an element, which stores a multimedia message addressed to the wireless terminal MS in its memory if the wireless terminal MS to which the multimedia message in question cannot be contacted. The MMSC further forwards the multimedia message to the wireless terminal MS when it can be reached again. Alternatively, if the mobile terminal to which the message is addressed can be contacted straight away, the multimedia message is forwarded substantially at once. This messaging mechanism is known as store-and-forward messaging. A corresponding arrangement is known in connection with SMS messages of the GSM network, in which the network's Short Message Service Center (SMSC) performs store-and-forward messaging of SMS messages.

The MMSC communicates with the wireless terminal MS through a WAP gateway 15. Physically, the MMSC is preferably located in the same part of the Internet network as the WAP gateway 15. Typically, communication between the MMSC and the WAP gateway 15 is effected according to protocols (IP protocols) of the Internet network. These are, e.g. TCP/IP and HTTP 1.1.

When a multimedia message, which may contain one or more multimedia components, such as text, images, photographs, audio clips or video clips in an electronic format, addressed to a wireless terminal MS that has subscribed to the multimedia messaging service from the MMSC, arrives at the MMSC, the MMSC stores it in its memory and sends the wireless terminal a notification message 30 to indicate the arrival of the message at the MMSC.

Figure 6:
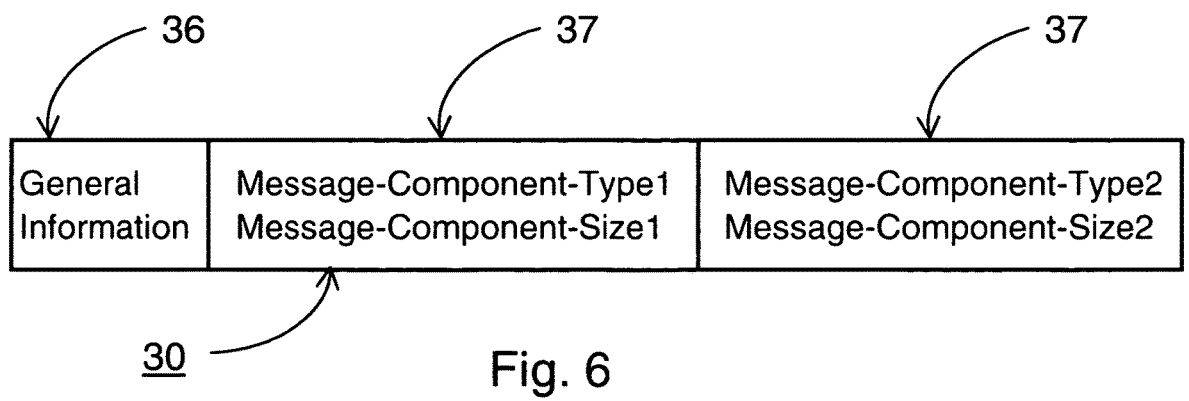
FIG. 6 shows a basic structure of a notification message according to the invention.

In a preferred embodiment of the invention, the notification message 30 is implemented using a new WAP content type, referred to here as a Multimedia Message Indication (MMI). The MMI is a content type, defined so as to allow the transmission of data in both text format and binary format in the same content type. Both an Internet compatible XML format (eXtensible Markup Language) text representation and a binary format in accordance with WAP binary coding are defined for the MMI content type. FIG. 6 shows one possible basic structure of an MMI-type notification message 30, which comprises a general part "General Information" 36, as well as fields 37 (of which there are two in FIG. 6) for expressing properties of multimedia components comprised by multimedia messages. The "General Information" part 36 comprises fields that express general information about the multimedia message stored in the MMSC. This can be, for example, information about the address of the sender of the multimedia message and its importance. The properties of the multimedia components expressed by the fields 37 are, for example, the type and size of each multimedia component. If the multimedia message stored in the MMSC comprises a component in text format having a size of 330 bytes and a 164 kilobyte JPG format image, the entries corresponding to the fields 37 in a text format MMI-type notification message 30 would appear, for example, as follows:

. . . .
  Message-Component-Type1: text/plain
  Message-Component-Size1: 330
  Message-Component-Type2: image/jpg
  Message-Component-Size2: 164000
. . . .

Adding a new content type to WAP and making the software changes required by it in the system are well known to a person skilled in the art who has familiarised himself with the specification practices of WAP. Alternatively, the notification message 30 can be delivered to the wireless terminal MS in some manner generally known from wireless networks, such as an SMS message.

The difference between data in text format and in binary format is evident in the grouping of data, although all data is transmitted over the radio path in binary format. Data in text format is grouped so that each character or letter is represented by a specific code word that is transmitted. Said code word can be, for example, eight bits long. In transmitting data in a binary format, only individual bits are transmitted, whereupon data transmission capacity is saved. In the WAP system, for example, a given value is defined for given words of the XML language. For example, in WAP coding the word "ENTITY" of the XML language may be assigned the value "2", whereupon when transmitting said word, data transmission capacity is saved, because now instead of six characters only one character in a binary format must be transmitted.

In a preferred embodiment of the invention, an MMI-type notification message 30 is used and the data to be transmitted is in binary format. The notification message 30 may be transferred from the MMSC to the WAP gateway as a message according to the IP protocol, e.g. in XML format using the POST command defined in HTTP 1.1 (Hyper Text Transfer Protocol). If the notification message 30 comprises parts in text format, the WAP gateway converts those parts into a binary format according to the WAP protocol and directs the notification message 30 to the wireless terminal over the radio path using a specific bearer. Said conversion can also be carried out already in the MMSC. The bearer used for the transfer of the notification message 30 can be, for example, the GSM network short message service (SMS) or USSD service, which are both so-called connectionless services.

Here the difference between connection oriented and connectionless services should be considered. In a connection oriented service, a specific (dedicated) communication link is first established between the communicating parties before the actual data transmission can be effected. An example of a connection oriented service is a data call in a cellular network. In a connectionless service, no dedicated communication link must be established. The GSM SMS service is an example of a connectionless service, the transmission of SMS messages taking place on a communication channel that is usually used for signalling purposes. Furthermore, in certain packet-based types of connectionless data transmission, such as UDP (User Datagram Protocol) in the Internet, the route to be used for the transfer of data is not determined in advance and may be different for different data packets.

The notification message 30 transmitted by the MMSC to the wireless terminal MS comprises specific data on the properties of the multimedia message for decision-making performed in the wireless terminal MS relating to the retrieval of the multimedia message. Preferably, said notification message 30 comprises information on the size and type of the multimedia message stored in the MMSC or the multimedia components it comprises. In the notification message 30 said type information is provided either by MIME types in text format (e.g. image/jpg, text/plain, audio/mpeg, sound/wav) or by corresponding binary equivalents, specified in WAP. In a preferred embodiment of the invention, said binary equivalents are used. Furthermore, the notification message 30 can comprise information on the importance of the multimedia message, i.e. a so-called priority value. Typically, the notification message 30 also comprises information on the sender of the multimedia message, as well as the multimedia message's URL (Uniform Resource Locator) or URI (Uniform Resource Identifier) or some other identifier for identifying the multimedia message. If the multimedia message comprises more than one multimedia component, the notification message 30 may also comprise a separate identifier for each component of the multimedia message.

On receiving said notification message 30, the wireless terminal MS makes a decision concerning retrieval of the multimedia message from the MMSC and selects the bearer to be used in the transfer of the multimedia message over the radio path. Correspondingly, if the multimedia message comprises several multimedia components, the wireless terminal MS selects the multimedia components comprised by the multimedia message it wants to retrieve, or is able to retrieve, from the MMSC, and selects the bearer to be used in the transfer of each selected multimedia component over the radio path. To optimise the use of radio resources, the wireless terminal MS can select the most appropriate bearer for the transfer of each different multimedia component.

The wireless terminal MS makes the decision concerning retrieval of the multimedia message or the multimedia components it comprises and selects an appropriate bearer(s) with the aid of specific data conveyed in the notification message 30. Typically, this data includes information on the size and type of the multimedia message or the multimedia components it comprises. According to the invention, selection of a bearer may be performed on the basis of only one property of the multimedia message or the multimedia components it comprises. This property can be for example the type, size or priority value (importance) of the multimedia message or the multimedia components it comprises. Thus, selection of a bearer according to the invention can be made for each multimedia component of the multimedia message, for example, merely on the basis of the size of the multimedia components. Furthermore, certain user configurable rules, the priority value of the multimedia message and certain properties of the wireless terminal MS, such as the available memory space and the terminal's ability to process and display different types of multimedia component types on its display, can be taken into consideration in the decision-making process.

In the following, the decision-making process performed in the wireless terminal MS according to the invention will be presented in slightly more detail by way of example. It is assumed that a multimedia message addressed to the wireless terminal MS comprising at least one multimedia component, arrives at the MMSC. A notification message 30 comprising information on at least one property of the multimedia message or components is transmitted from the MMSC to the wireless terminal MS. Typically, the notification message 30 comprises information on at least the size and type of the multimedia message or the multimedia components it comprises. The wireless terminal has knowledge of its available memory space, the multimedia component types it is capable of processing (and e.g. displaying on its display), as well as the bearers of the WAP system it supports.

After receiving the notification message 30, the wireless terminal MS determines whether it can receive and process said multimedia components. This is accomplished by comparing the information delivered to the wireless terminal in the notification message 30 relating to the size of the multimedia components stored in the MMSC to the wireless terminal's available memory and by comparing the information on the type of the multimedia components present in the message with the types the wireless terminal MS is capable of processing. If there is sufficient memory space and the wireless terminal MS recognises the types of the multimedia components in question as types it is capable of processing, the wireless terminal MS decides to retrieve said multimedia components from the MMSC.

However, according to the invention the user may also be provided with means for affecting the decision-making process performed by the wireless terminal MS through so-called user configurable rules. Preferably these user configurable rules are included in the wireless terminal's factory-installed software in a specific database, and are available to the application software of the wireless terminal MS. The user of the wireless terminal MS may turn rules on and off or modify the rules, for example, by using a specific menu of the wireless terminal's user interface. When making a decision relating to the retrieval of a multimedia component, the wireless terminal MS reads the user configurable rules from said database and takes them into consideration in its decision-making. The user may, for example, establish a rule to prevent the wireless terminal MS from retrieving multimedia messages sent from a given address from the MMSC. Naturally, this requires that information identifying the sender of the multimedia message is transmitted in the notification message 30. The user may also, for example, prevent the retrieval of a multimedia message or component of a particular type, although there is no other obstacle to the retrieval of said multimedia message or component. The user may also define a rule according to which the cost of data transmission is taken into consideration when selecting a bearer. When this rule is active, the wireless terminal MS always selects the cheapest possible (or cheapest available) bearer suitable for the transfer of a component of a particular type. The user may also define a rule according to which the data transfer rate is taken into consideration when selecting a bearer, whereupon the wireless terminal MS can, for example, always select the fastest bearer suitable for the transfer of a particular type of multimedia component. In the examples presented above, the wireless terminal MS does not necessarily always end up selecting a bearer that consumes the least radio resources.

When making a decision on the retrieval of a multimedia message, if the wireless terminal MS notices that the size of some multimedia component is too large to be accommodated in the memory of the wireless terminal MS, or its type is such that the wireless terminal MS is incapable of processing it, the wireless terminal may decide not to retrieve said multimedia component. Alternatively, the wireless terminal MS may postpone the retrieval for a specific period of time and retrieve the multimedia message only after enough memory space has been freed in the wireless terminal MS.

Alternatively, if the wireless terminal MS notices that the size of some multimedia component is too large to be accommodated in the memory of the wireless terminal MS, or its type is such that the wireless terminal MS is incapable of processing it, the wireless terminal MS can inform the user of this, e.g. on its display. The wireless terminal MS may also present on its display a list of steps that the user may take in order to solve the problem. Typically, in this situation, the wireless terminal MS waits for input regarding the steps the user will take. The user may provide input to the wireless terminal, e.g. using the keyboard, or in some other well-known manner. The list of steps proposed by the wireless terminal MS may comprise, e.g. some of the following: a) attaching a laptop computer or the like to the wireless terminal MS to enable processing of said multimedia component. In this case the wireless terminal MS would retrieve the multimedia component from the MMSC but would transfer it to the laptop computer for processing; b) attaching a separate Multimedia Memory Card (MMMC) to the wireless terminal MS to expand its available memory space.

After deciding to retrieve one or more multimedia components comprised by the multimedia message from the MMSC, the wireless terminal MS selects a bearer to be used for the transfer of the multimedia components, based on the information relating to the type of each multimedia component delivered in the notification message 30. Alternatively, selection of a bearer may also be carried out on the basis of the size of a multimedia component, or on the basis of the priority value of a multimedia component. According to an advantageous embodiment of the invention, in order to perform the selection, the software that controls the wireless terminal MS comprises a database comprising a so-called mapping table. Preferably, the mapping table indicates, for each multimedia component type, a default bearer, which is used in the transfer of said multimedia component type over the radio path from the WAP gateway to the wireless terminal MS. Correspondingly, if selection of a bearer is carried out merely on the basis of the size or priority value of a multimedia component, it is possible to define a specific default bearer for each size category or priority value of a multimedia message in the mapping table. For example, the SMS bearer of the GSM network may be defined as the default bearer for a message/component of the MIME-type text/plain. In this case, if the MIME-type of a multimedia component is text/plain, the mobile station will select the GSM SMS bearer as the bearer to be used in the transfer of said multimedia component.

In the selection of a bearer (and in the implementation of the mapping table related thereto), it is also possible to take into consideration more than one property of a multimedia message. In this case, it is also possible, for example, to take into consideration information on the size of a multimedia component delivered in the notification message 30, so that short textual data can be selected for transmission using the GSM SMS service whereas, for example, longer textual data can be transferred via a GSM data call, HSCSD (High Speed Circuit Switched Data) or a GSM GPRS data connection. In this case, more alternatives may be defined in the mapping table as default bearers for specific multimedia component types. These may include, for example, GSM-SMS as the "text/plain—short" alternative for the text/plain MIME-type and, GSM-HSCSD as the "text/plain—long" alternative. Correspondingly, for a specific multimedia component type, "more expensive" and "less expensive" alternatives and "slower" and "faster" alternatives can be defined when using the cost or speed of data transmission (bearer) in addition to data relating to the type of message/message component, as the decisive factor in the wireless terminal's bearer selection process.

If a multimedia message comprises more than one multimedia component, the bearer selected for the transfer of each different multimedia component type is preferably the bearer assigned to that particular type in the mapping table. Thus, for example, if a multimedia message comprises both a text component and a video clip, it can be decided that the text component is transferred using SMS and the video clip is transmitted, e.g. over a circuit or packet switched data connection. Alternatively, according to the invention, it is also possible to select all the multimedia components to be transferred using the same bearer irrespective of the type of the component.

In a preferred embodiment of the invention, the priority value of a multimedia message can be taken into consideration when selecting a bearer, if it has been delivered in the above-mentioned notification message 30 transmitted from the MMSC to the wireless terminal MS. This being the case, the fastest available bearer can be selected for a multimedia message that has a high priority value, which generally means the bearer for which the most transfer capacity is available in the system.

The mapping table is preferably included in the factory-installed software of the wireless terminal MS and can be updated if a new bearer (i.e. a new radio communication mode) is added to the system or an existing bearer is removed from the system. This can be done, for example, in a manner similar to that presented in connection with definition of user configurable rules.

To retrieve a multimedia message or desired multimedia component(s), the wireless terminal opens a connection to the MMSC, if such does not exist already. In a preferred embodiment of the invention, a connection is established in such a way that the wireless terminal MS opens, in a manner known from WAP, a WSP session with the WAP gateway 15, and the WAP gateway 15 further establishes, e.g. an IP connection with the MMSC. Information concerning the bearer selected by the wireless terminal MS and, consequently, that to be used in the WSP session to be opened, is transmitted from the wireless terminal MS to the WAP gateway 15 in a well-known manner, in a WSP HEADER field as a Bearer Indication value. Transmission of said information takes place during negotiation between the wireless terminal MS and the WAP gateway 15 on the opening of the WSP session.

When the WSP session has been established, the wireless terminal MS can retrieve the desired multimedia message or the multimedia component(s) from the MMSC, for example, using the GET method defined in WAP. In the GET method, the wireless terminal MS first sends the WAP gateway 15 a GET request 31 in binary format to retrieve a specific multimedia message or component from the MMSC. The WAP gateway 15 converts the GET request 31 into a GET request according to an Internet protocol, e.g. into an HTTP GET request 32, and sends it to the MMSC.

In response to the GET request, the MMSC transmits 33 the requested multimedia message or the requested multimedia component(s) over the IP connection to the WAP gateway 15, which conveys 34 the message or component(s) to the wireless terminal MS using the bearer(s) selected by the wireless terminal MS for the WSP session in question, either as a connection oriented or connectionless service. Typically, a given multimedia component is displayed to the user only after it has been completely transferred into the memory of the wireless terminal MS. In specific cases, such as, for example, when a multimedia component comprises video pictures, a so-called "streaming" alternative is also possible. In this case, it is already possible to start playing an initial buffered part of the video clip before the video clip has been fully transferred to the wireless terminal MS.

If the multimedia message to be transferred comprises more than one type of multimedia component, the wireless terminal MS will typically have selected different bearers for the transfer of the different types of multimedia component in the manner presented above. In this case, the multimedia component which the mobile terminal has selected to be transferred using the bearer that is currently active in the WSP session is transmitted first, assuming an appropriate bearer is indeed active. A change in bearer can be implemented by placing the WSP session in a Suspend state using the S-Suspend primitive and by restarting it with the S-Resume primitive.

In a preferred embodiment of the invention the multimedia message conveyed by the MMSC to a wireless terminal that has subscribed to the multimedia messaging service, may originate from many different sources. It can be a photograph, a home video clip or a voice message transmitted in an electronic format from one wireless terminal to another. It can also be, for example, an electronic mail message comprising a multimedia component to be conveyed to the wireless terminal transmitted from a TCP/IP network to the MMSC, or any message comprising multimedia components.

The invention can also be implemented without WAP technology, in which case the implementation is dependent on the network in question. For instance, it is possible to communicate between an Internet network server providing the functionality of an MMSC and a wireless terminal in packet switched mode using IP protocols. It is possible to communicate over the radio path using, e.g. IP protocols on top of the GPRS service of a GSM network. In this case, instead of a WAP gateway, a Gateway GPRS Support Node (GGSN) of the GPRS network acts as the element connecting the wireless network and the Internet network. In this case, the selection of a bearer according to the invention can be implemented using bearers supported by GPRS, which are, for example, GPRS-SMS, GPRS data call and other bearers defined in GPRS. A corresponding solution is also possible in third generation networks.

The invention can be implemented in software by making the necessary changes in the program code in the wireless terminal and the MMSC. The computer program products in question can be stored on a data medium, for example, in memory, they can be transferred, and they can be executed, for example, in a computer, or in the microprocessor of a wireless terminal. In the MMSC, the software changes required relating to the adoption of the MMI content type are made at the WAP gateway interface of the MMSC. The functional blocks of the MMSC will be presented later in the description, in connection with FIG. 5.

Figure 3:
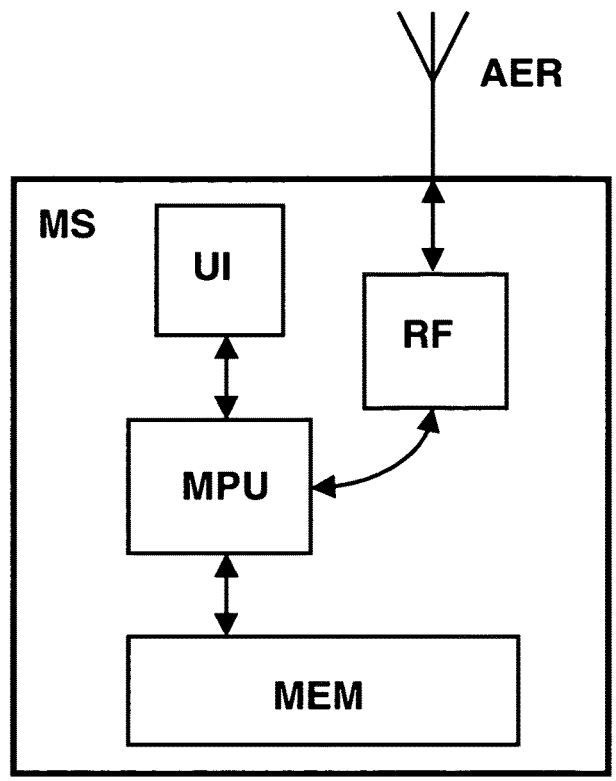
FIG. 3 illustrates the basic parts of a mobile station that implements a method according to the invention.

FIG. 3 illustrates the basic parts relevant to the operation of a wireless terminal that implements a method according to the invention. The wireless terminal MS comprises a processor MPU and parts functionally connected to the processor: a memory MEM, a user interface UI, and radio part RF. The processor MPU is preferably a microprocessor, microcontroller or a digital signal processor (DSP). The memory MEM preferably comprises a non-volatile read only memory (ROM) and a random access memory (RAM). The radio part RF can transmit radio frequency signals, such as messages according to the WAP protocol and receive radio frequency signals, such as multimedia messages, with its antenna AER. The user interface UI preferably provides the user with a display and a keyboard for operating the wireless terminal MS.

The software of the wireless terminal MS, as well as the software related to the implementation of the multimedia messaging service, is typically stored in the non-volatile memory. On the basis of the software, the processor MPU controls the operation of the wireless terminal MS, such as the use of the radio part RF, the presentation of messages with the user interface UI and the reading of inputs received from the user interface UI. The software, which can be implemented in many different ways, preferably comprises program blocks, which correspond to the implementation of different procedures. These procedures are, for example, procedures relating to the display of multimedia components contained in multimedia messages to the user, as well as procedures relating to the transmission and reception of messages. In the wireless terminal, the multimedia messaging service is implemented by the processor MPU together with the software and memory MEM of the wireless terminal. The processor MPU uses the random access memory as a temporary buffer memory when processing data.

Figure 4:
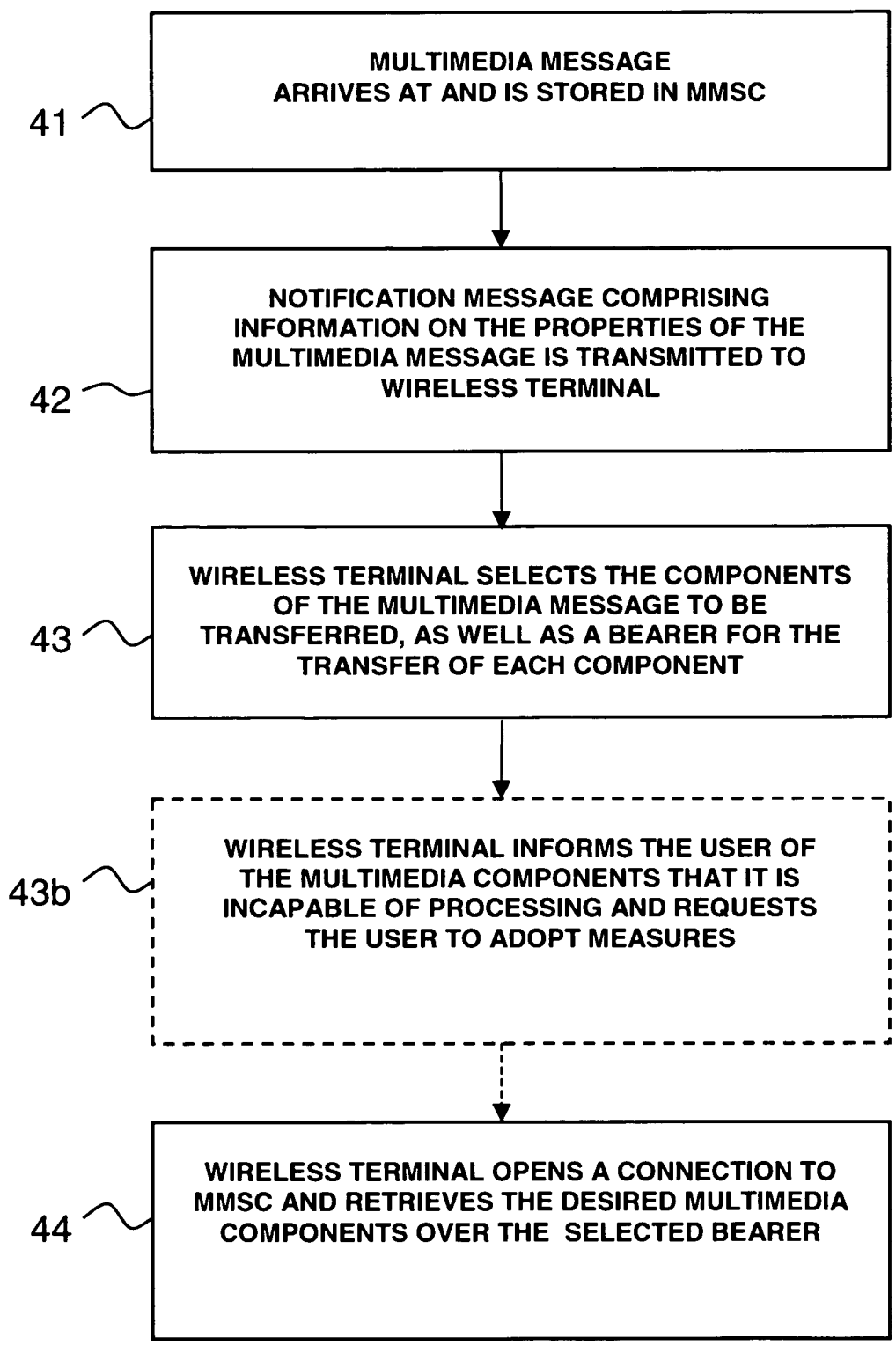
FIG. 4 is a flow diagram that shows a decision-making process according to the invention.

The flow diagram in FIG. 4 illustrates a decision-making process according to the invention in the light of a preferred embodiment of the invention. In the first phase, a multimedia message comprising at least one multimedia component, addressed to a wireless terminal, arrives at and is stored in an MMSC (Block 41), after which a notification message comprising data on the properties of said multimedia message is transmitted to the wireless terminal (Block 42). On the basis of the data contained in the notification message, the wireless terminal selects the multimedia component(s) to be retrieved, as well as the bearer/bearers that will be used to transfer the multimedia component(s) from the MMSC to the wireless terminal (Block 43). After this, the wireless terminal opens a connection to the MMSC and retrieves the desired multimedia component(s) using the previously selected bearer/bearers (Block 44). Optionally, if the wireless terminal determines, on the basis of the data contained in said notification message and the state of the wireless terminal, that the wireless terminal does not have the capability to process, or is currently unable to process, a specific component of the multimedia message, the wireless terminal informs the user of the device and requests the user to take certain steps. For example, if the wireless terminal is a mobile station of a cellular network, the user may be instructed to attach a laptop computer to the wireless terminal to enable said multimedia component to be processed (Block 43b). Otherwise, communication between the MMSC and the wireless terminal occurs in a manner transparent to the user. In FIG. 4 the optional block 43b is drawn with a dashed line.

Figure 5:
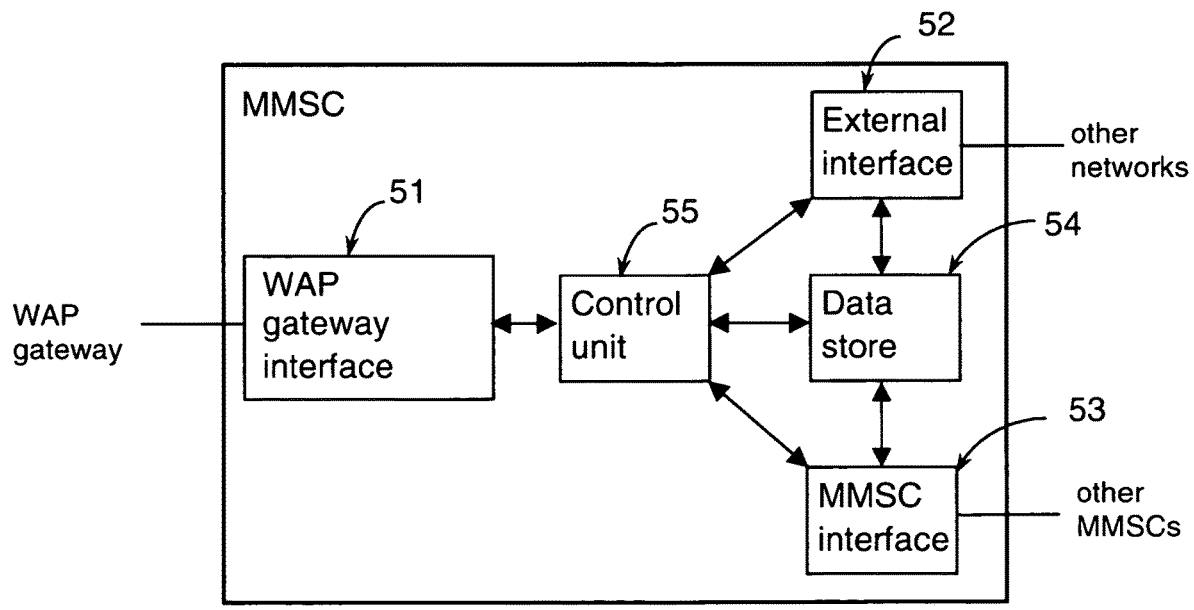
FIG. 5 is a block diagram that illustrates functional blocks of an MMSC.

FIG. 5 shows a block diagram illustrating functional blocks of the MMSC relating to implementation of the present invention. The MMSC comprises a WAP gateway interface 51 through which the MMSC communicates with the WAP gateway 15. Communication with other networks outside the WAP system is managed through an external interface 52, and communication with other multimedia messaging service centres is handled via MMSC interface 53. Data store 54 is a database, in which multimedia messages are recorded and stored. Control unit 55 controls the operation of the MMSC. Typically, the MMSC also comprises some blocks relating to authentication and the maintenance of the MMSC, but these are not shown in the figure.

According to the invention, multimedia messages addressed to the wireless terminal MS arrive at the MMSC through one of its interfaces (51-53) and are stored in the data store 54. The notification message 30, transmitted to the wireless terminal MS, is preferably generated at the WAP gateway interface 51, at the command of the control unit 55. Transmission of the notification message 30 takes place via the WAP gateway interface 51. Further, the multimedia messages, or multimedia components thereof, which the wireless terminal MS decides to retrieve from the MMSC are transmitted 33 in due course to the wireless terminal MS through the WAP gateway interface.

According to the present invention, network radio resources can be conserved by selecting the most appropriate bearer for the transfer of multimedia components over the radio path. The method according to the invention is implemented by a so-called pull technique in which a wireless terminal can decide for itself which multimedia components it will retrieve from the multimedia messaging service centre. The invention supports wireless terminal initiated connections and, thus, preferably it does not support network initiated connections which may be hazardous from a security point of view.

This description presents the implementation and embodiments of the present invention with the aid of examples. A person skilled in the art will appreciate that the present invention is not restricted to details of the embodiments presented above, and that the invention can also be implemented in other forms without deviating from the characteristics of the invention. The embodiments presented above should be considered illustrative, but not restrictive. Thus, the possibilities for implementing and using the invention are only restricted by the enclosed claims. Consequently, the various options of implementing the invention as determined by the claims, including equivalent implementations thereof, also belong to the scope of the invention.

The invention claimed is:

1. An apparatus comprising:
 a processor, and
 a memory including computer software, the memory and the computer software configured to, with the processor, cause the apparatus to perform receiving at the apparatus a notification message from a server over a radio path, the notification message being a notification that a multimedia message addressed to the apparatus and comprising a plurality of message components has arrived at said server, wherein said notification message comprises property information for each of the plurality of message components;
 selecting at the apparatus at least one message component to be transferred to the apparatus, on the basis of the property information included in the notification message where the property information includes at least one of size, type, and a priority value of each respective message component conveyed by said notification message;
 in response to receiving the notification message, automatically selecting by the apparatus at least one bearer for the at least one selected message component, each of the at least one selected bearer selected for a respective selected message component on the basis of cost of data transmission to the apparatus and an ability of the apparatus to process the respective selected message component and the property information of the respective message component, included in said notification message, for the transfer of the at least one selected message component from said server to the apparatus over said radio path; and
 receiving, at the apparatus, the at least one selected message component from the server over the at least one selected bearer such that, when at least two message components are selected to be transferred to the apparatus, a message component of the at least two selected message components that uses a currently active bearer is prioritized for transfer.

2. An apparatus according to claim 1, wherein the memory and the computer software are further configured to, with the processor, cause the apparatus to initiate the transfer of said message component.

3. An apparatus according to claim 1, wherein the apparatus is one of the following: a mobile station of a cellular network, a computer terminal, a radio card.

4. An apparatus according to claim 1, wherein the memory and the computer software are further configured to, with the processor, cause the apparatus to inform a wireless communication network of the bearer selected by the apparatus.

5. A computer program product comprising a non-transitory computer useable medium having a computer readable program, wherein the computer readable program when executed by an apparatus causes the apparatus to:
receive a notification message from a server over a radio path, the notification message being a notification that a multimedia message addressed to the apparatus and comprising a plurality of message components has arrived at the server, wherein said notification message comprises property information for each of the plurality of message components;
select at least one message component to be transferred to the apparatus, on the basis of said property information included in the notification message which includes at least one of size, type, and a priority value for each respective message component;
automatically select at least one bearer for the at least one selected message component in response to receiving the notification message, each bearer selected for a respective selected message component on the basis of cost of data transmission to the mobile terminal and an ability of the mobile terminal to process the respective message component and the property information for the respective message component; and
receiving, at the mobile terminal, the at least one selected message component from the server over the at least one selected bearer such that, when at least two message components are selected to be transferred to the apparatus, a message component of the at least two selected message components that uses a currently active bearer is prioritized for transfer.

6. A method comprising:
receiving at a mobile terminal a notification message from a server, the notification message indicating arrival of a plurality of message components of a multimedia message at the server, the notification message comprising property information for the plurality of message components;
automatically selecting, by the mobile terminal, at least one message component to be transferred to the terminal, based at least in part on the property information received in the notification message;
automatically selecting by the mobile terminal, at least one bearer for the at least one selected message component, each of the at least one selected bearer selected for a respective selected message component based at least in part on cost of data transmission to the mobile terminal and the property information received in the notification message and an ability of the mobile terminal to process the respective selected message component; and
receiving, at the mobile terminal, the at least one selected message component from the server over the at least one selected bearer such that, when at least two message components are selected to be transferred to the mobile terminal, a message component of the at least two selected message components that uses a currently active bearer is prioritized for transfer,
wherein the property information comprises one or more of a type, a size, and a priority value of each of the plurality of message components.

7. A method according to claim 6, wherein said message component comprises more than one message component, and the mobile terminal selects more than one message component to be transferred to the mobile terminal, wherein each selected bearer is selected from among a set of bearers supported by the mobile terminal.

8. A method according to claim 6, wherein the method further comprises:
defining at least one user configurable rule in the mobile terminal; and
using said at least one user configurable rule in said selection of a bearer.

9. A method according to claim 6, wherein there is more than one message component type, and a default bearer is defined for each of said more than one message component type wherein, for a message component of a given message component type, the mobile terminal selects the default bearer defined for a message component type of the message component for transmission of the message component over the radio path.

10. A method according to claim 9, wherein the mobile terminal further selects a bearer for transmission of the respective selected message component from the server from among said more than one default bearer defined for the message component type of the respective selected message component according to one of the following criteria: data transmission rate of a default bearer; size of the message component.

11. A method according to claim 6, wherein the selecting the bearer at the mobile terminal for receiving the at least one message component is further based on a property of the bearer.

12. A method according to claim 11, wherein the selecting the bearer at the mobile terminal for receiving the at least one message component is further based on a property of the bearer.

13. A method comprising:
receiving at a mobile terminal a notification message from a server, the notification message indicating arrival of a plurality of message components at the server, the notification message comprising property information about at least one property for the plurality of message components;
automatically selecting and determining at the mobile terminal whether to receive at least one of the plurality of message components from the server, based at least in part on the property information received in the notification message;
upon determining to receive the at least one message component, automatically selecting by the mobile terminal at least one bearer for receiving the at least one selected message component, each of the at least one selected bearer selected a respective selected message component based at least in part on cost of data transmission to the mobile terminal and the property information for the respective selected message component received in the notification message and an ability of the mobile terminal to process the respective selected message component; and
receiving, at the mobile terminal, the at least one selected message component from the server over the at least one selected bearer such that, when at least two message components are selected to be transferred to the mobile terminal, a message component of the at least two selected message components that uses a currently active bearer is prioritized for transfer, wherein the property information comprises one or more of a type, a size, and a priority value of each the plurality of message components.

14. A method according to claim 13, wherein said notification message further comprises information about the sender of said message component, wherein the determining concerning retrieval of the message component to the mobile terminal is made based at least in part on said information about the sender of the multimedia message.

15. A method according to claim 13, wherein the method further comprises defining in the apparatus at least one user configurable rule wherein the decision concerning retrieval of the message component to the mobile terminal is made at least in part using said at least one user configurable rule.

16. An apparatus comprising:
a processor, and
a memory including computer software, the memory and the computer software configured to, with the processor, cause the apparatus to:
receive at the apparatus a notification message from a server, the notification message indicating arrival of a plurality of message components at the server, the notification message comprising property information about the plurality of message components; automatically selecting, by the mobile terminal, at least one message component to be transferred to the terminal, based at least in part on the property information received in the notification message;
automatically select by the apparatus, at least one bearer for receiving the at least one selected message component, each of the at least one selected bearer selected for a respective selected message component based at least in part on cost of data transmission to the apparatus and the property information of the respective selected message component received in the notification message and an ability of the mobile terminal to process the respective selected message component; and
receiving, at the mobile terminal, the at least one selected message component from the server over the at least one selected bearer such that, when at least two message components are selected to be transferred to the apparatus, a message component of the at least two selected message components that uses a currently active bearer is prioritized for transfer, wherein the property information comprises one or more of a type, a size, and a priority value for each of the plurality message components.

17. An apparatus according to claim 16, wherein the memory and the computer software are further configured to, with the processor, cause the apparatus to select the bearer at the mobile terminal for receiving the at least one message component based at least in part on a property of the bearer.

18. A mobile terminal comprising:
a processor, and a memory including computer software, the memory and the computer software configured to, with the processor, cause the mobile terminal to:
receive at the mobile terminal a notification message from a server, the notification message indicating arrival of a plurality of message components at the server, the notification message comprising property information for the plurality of message components;
automatically select at the mobile terminal at least one of the plurality of message components from the server, based at least in part on the property information received in the notification message;
upon determining to receive the at least one selected message component, automatically select by the mobile terminal at least one bearer for receiving the at least one selected message component, each of the at least one selected bearer selected for a respective selected message component based at least in part on cost of data transmission to the mobile terminal and the property information of the respective selected message component received in the notification message and an ability of the mobile terminal to process the respective selected message component; and
receive the at least one selected message component from the server over the at least one selected bearer such that, when at least two message components are selected to be transferred to the mobile terminal, a message component of the at least two selected message components that uses a currently active bearer is prioritized for transfer,
wherein the property information comprises one or more of a type, a size, and a priority value for each of the plurality of message components.

* * * * *